(12) United States Patent
Zhou et al.

(10) Patent No.: US 12,511,907 B2
(45) Date of Patent: Dec. 30, 2025

(54) CROWDING DEGREE ESTIMATION METHOD, ELECTRONIC DEVICE AND STORAGE MEDIUM

(71) Applicant: HON HAI PRECISION INDUSTRY CO., LTD., New Taipei (TW)

(72) Inventors: Yu-Kai Zhou, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 423 days.

(21) Appl. No.: 18/129,771

(22) Filed: Mar. 31, 2023

(65) Prior Publication Data

US 2024/0177490 A1    May 30, 2024

(30) Foreign Application Priority Data

Nov. 30, 2022   (CN) .......................... 202211528585.5

(51) Int. Cl.
*G06V 10/82* (2022.01)
*G06V 20/52* (2022.01)
*G06V 20/59* (2022.01)

(52) U.S. Cl.
CPC .............. *G06V 20/53* (2022.01); *G06V 20/59* (2022.01)

(58) Field of Classification Search
CPC ........ G06V 20/53; G06V 20/59; G06V 10/82; G06V 2201/07; G06Q 10/06311
See application file for complete search history.

(56) References Cited

U.S. PATENT DOCUMENTS 11,157,839 B2 *  10/2021  Tran .......................... G06N 5/02

FOREIGN PATENT DOCUMENTS

| CN | 102501888 |   | 6/2012 |            |
|----|-----------|---|--------|------------|
| CN | 103021059 |   | 4/2013 |            |
| CN | 103964271 | B * | 4/2016 |          |
| CN | 105574503 |   | 5/2016 |            |
| CN | 105574503 | A * | 5/2016 | ........... G06V 40/166 |

* cited by examiner

*Primary Examiner* — Vu Le
*Assistant Examiner* — Lei Zhao
(74) *Attorney, Agent, or Firm* — ScienBiziP, P.C.

(57) ABSTRACT

A crowding degree estimation method applied to an electronic device is provided. In the method, the electronic device determines a remaining carrying space of a carriage according to an image viewed from a top of an interior of the carriage, and determines a recommended remaining number of people that can be carried according to the remaining carrying space, the number of people already in the carriage, and a maximum number of people that can be carried of the carriage. The electronic device determines the crowding degree according to the recommended remaining number of people. The method can determine the crowding degree of each carriage of a public transportation and recommend passengers with less crowded carriages to save passengers' waiting time.

14 Claims, 5 Drawing Sheets

CROWDING DEGREE ESTIMATION METHOD, ELECTRONIC DEVICE AND STORAGE MEDIUM

FIELD

The present disclosure relates to a field of public transportation, in particular to a crowding degree estimation method, an electronic device, and a storage medium.

BACKGROUND

When passengers take public transportation (such as subways), it is usually impossible to know a degree of crowding of the transportation in advance. Sometimes the public transportation is too crowded, and the passengers cannot get into the public transportation. Then the passengers need to wait for the next one. Such a method of riding is random and inefficient.

DETAILED DESCRIPTION

Figure 1:
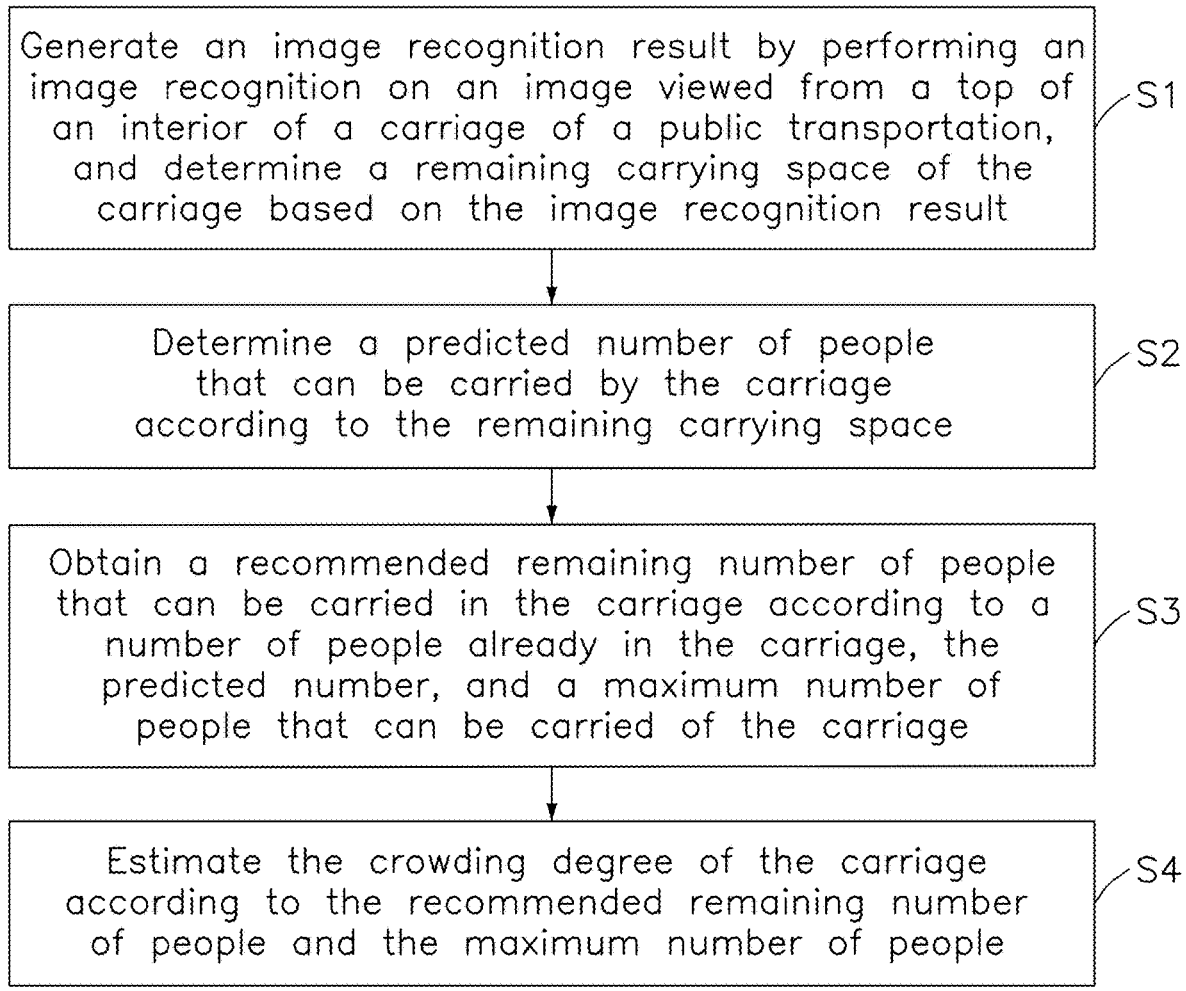
FIG. 1 is a flowchart of a crowding degree estimation method provided by an embodiment of the present disclosure.

Plurality of embodiments are described in the present disclosure, but the description is exemplary rather than limiting, and there may be more embodiments and implementation solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

When describing representative embodiments, the specification may present methods and/or processes as a specific sequence of steps. However, to the extent that the method or process does not depend on the specific order of steps described in the present disclosure, the method or process should not be limited to the specific order of steps described. As understood by those of ordinary skills in the art, other orders of steps are also possible. Therefore, the specific order of steps set forth in the specification should not be interpreted as limitation to the claims. In addition, the claims for the method and/or process should not be limited to the steps performed in the written order, and those of skill in the art may readily understand that these orders may vary and still remain within the essence and scope of the embodiments of the present disclosure.

Unless otherwise defined, technical terms or scientific terms used in the embodiments shall have their common meanings as construed by those of ordinary skills in the art to which the present disclosure pertains. The terms "first", "second" and the like used in the embodiments of the present disclosure do not represent any order, quantity, or importance, but are merely used to distinguish between different components. The terms "include", "contain" or the like mean that elements or articles appearing before such terms may cover elements or articles listed after the words and their equivalents without excluding other elements or articles. The terms "connect", "link" or the like are not limited to physical or mechanical connection, but may include electrical connections, whether direct or indirect.

In one embodiment, when a passenger takes public transport (such as a subway), it is usually impossible to know in advance a crowding degree of each carriage of the public transport that is about to arrive at a station. The passenger usually needs to choose a carriage to wait in line according to riding experience. Sometimes the carriage that the passenger wait in line is too crowded and the passenger cannot get into the carriage. Then, the passenger needs to wait for a next one.

In order to solve the above problems, an embodiment of the present disclosure provides a method for determining a crowding degree of a carriage of the public transportation. The method includes determining a remaining carrying space of the carriage according to an image viewed from the top of the carriage; determining a recommended remaining number of people that can be carried according to the remaining carrying space, the number of people carried in the carriage, and a maximum number of people that can be carried of the carriage; and determining the crowding degree according to the recommended remaining number of people. The method can recommend a carriage with a lower degree of congestion for the passengers, thereby saving waiting time of the passengers, and effectively improving a travel efficiency of the passengers, and effectively avoiding an inconvenience caused by overcrowding.

FIG. 1 is a flowchart of a crowding degree estimation method provided by an embodiment of the present disclosure. In one embodiment, the method can be performed by using an electronic device (e.g., the electronic device 3 shown in FIG. 9). The electronic device may be an on-board device mounted in the public transportation. For the public transportation that need to determine a crowding degree, the electronic device can be installed in each carriage of the public transportation. The electronic device can be integrated with a crowding degree estimation function, or the crowding degree estimation function can be run on the electronic device in a form of a software development kit (SDK).

FIG. 1 illustrates a flowchart of an embodiment of a method for estimating a crowding degree. The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block S1.

At block S1, the electronic device generates an image recognition result by performing an image recognition on an image viewed from a top of an interior of a carriage of a public transportation, and determines a remaining carrying space of the carriage based on the image recognition result.

In one embodiment, a public transportation (such as a subway) includes multiple carriages, and at least one camera device (for example, a wide-angle camera) is installed in each carriage, and the camera device acquires the image viewed from the top of the carriage. For example, the at least one camera device may be installed on a top of the carriage to capture the image viewed from the top of the carriage.

In other embodiments, the camera device may also include a depth camera device, and the image viewed from the top of the carriage may include a depth image with a depth value captured by the depth camera device. Specifically, the camera device sets a depth value of each point of the carriage, which captured by the camera device, as a pixel value of the depth image.

Figure 2:
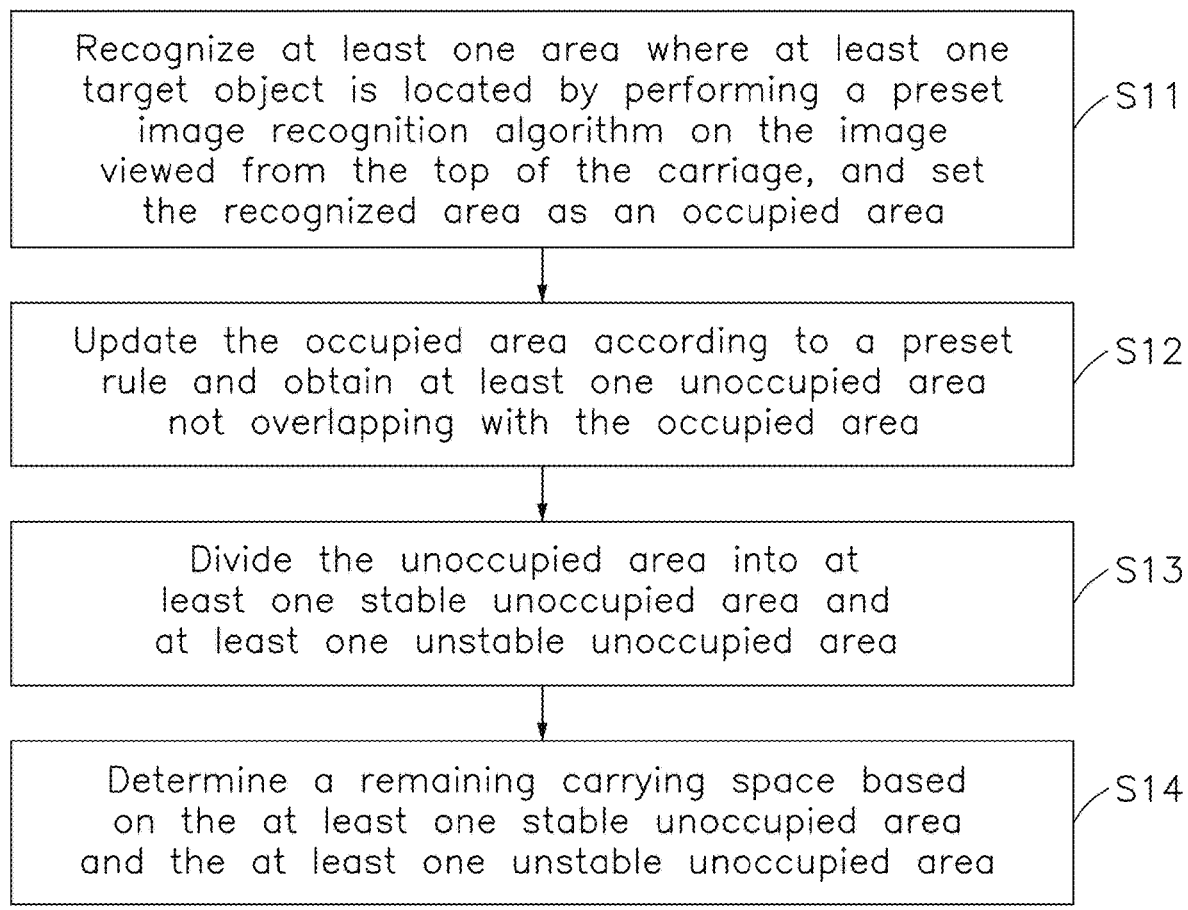
FIG. 2 is a flowchart of a method for determining a remaining carrying space of a carriage of a public transportation provided by an embodiment of the present disclosure.

In one embodiment, FIG. 2 is a flowchart of a method for determining a remaining carrying space of a carriage of a public transportation provided by the embodiment of the present disclosure, which specifically includes the following blocks:

In block S11, the electronic device recognizes at least one area where at least one target object is located by performing a preset image recognition algorithm on the image viewed from the top of the carriage, and sets the recognized area as an occupied area.

In one embodiment, the preset image recognition algorithm includes an Object Detection algorithm, and the Object Detection algorithm includes, but is not limited to a R-CNN (Region with Convolutional Neural Network features) algorithm, a YOLO (You Only Look Once) algorithm, a SSD (Single Short multibox Detector) algorithm.

In one embodiment, the at least one target object includes but is not limited to people, luggage (e.g., suitcases). Passengers can carry small luggage and big luggage. The big luggage should be placed on a ground of the carriage, which will occupy a space of the carriage. In order to accurately confirm the area where the target object is located, the electronic device sets an area threshold (for example, 0.5 square meters) in advance. The electronic device determines whether a ratio between the area where the luggage occupied and the image viewed from the top of the carriage is greater than the area threshold, and in response that the ratio is greater than the area threshold, the electronic device sets the area where the luggage occupied as the area where the target object is located. In at least one embodiment, the area threshold may also be set based on a ratio between the image viewed from the top of the carriage and the actual area of the carriage. For example, the area threshold may be equal to an area occupied by 100 pixels of the image viewed from the top of the carriage.

In other embodiments, in addition to perform the preset image recognition algorithm on the image viewed from the top of the carriage, the depth image described in block S1 can also be combined to further identify the area where the target object is located. For example, the electronic device presets a depth threshold (such as, 1.5 meters), excludes the area where the depth threshold is smaller than the depth threshold from the area where the target object is located. Furthermore, the electronic device sets the depth threshold based on an actual height of the carriage.

Figure 3:
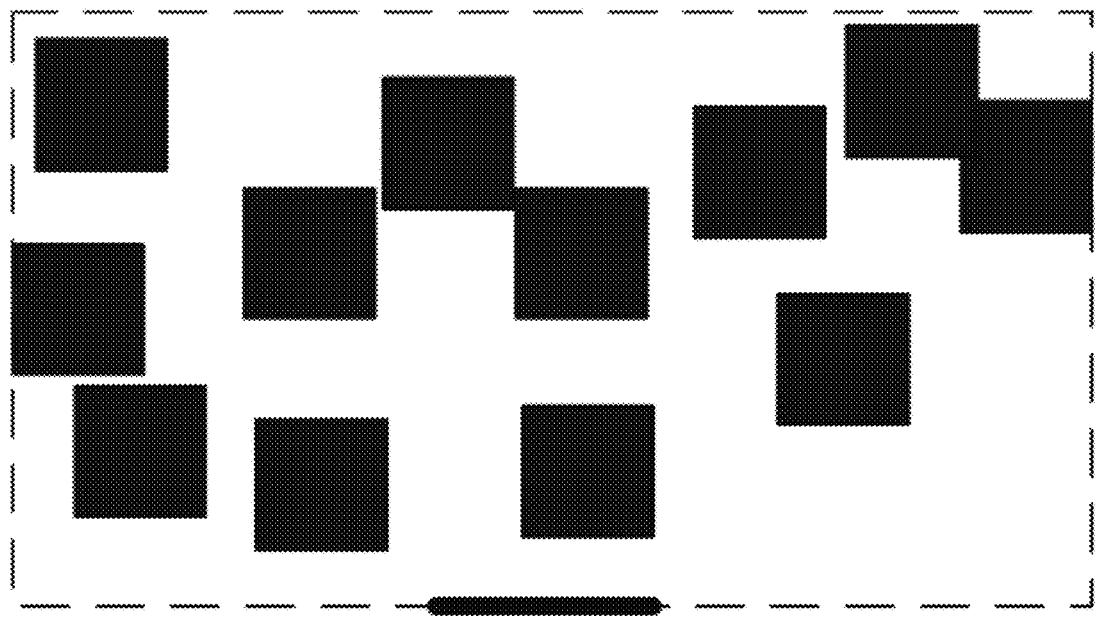
FIG. 3 is an example diagram of an occupied area corresponding to a target object provided by an embodiment of the present disclosure.

After recognizing the area of the target object by the image recognition algorithm, the electronic device obtains an occupied area by automatically framing the area where the target object is located. For example, using a rectangular frame to frame the area where the target object is located, and using the area inside the rectangular frame as the occupied area. For example, as shown in FIG. 3, it is an example diagram of the occupied area corresponding to the target object provided in the embodiment of the present disclosure. The entire image represents the image viewed from the top of the carriage, the dotted rectangular frame on the periphery represents the carriage wall, the black line in the dotted rectangular frame represents the carriage door, and the black filled square area represents the occupied area obtained after the target object is framed.

In block S12, the electronic device updates the occupied area according to a preset rule and obtains at least one unoccupied area not overlapping with the occupied area.

Figure 4:
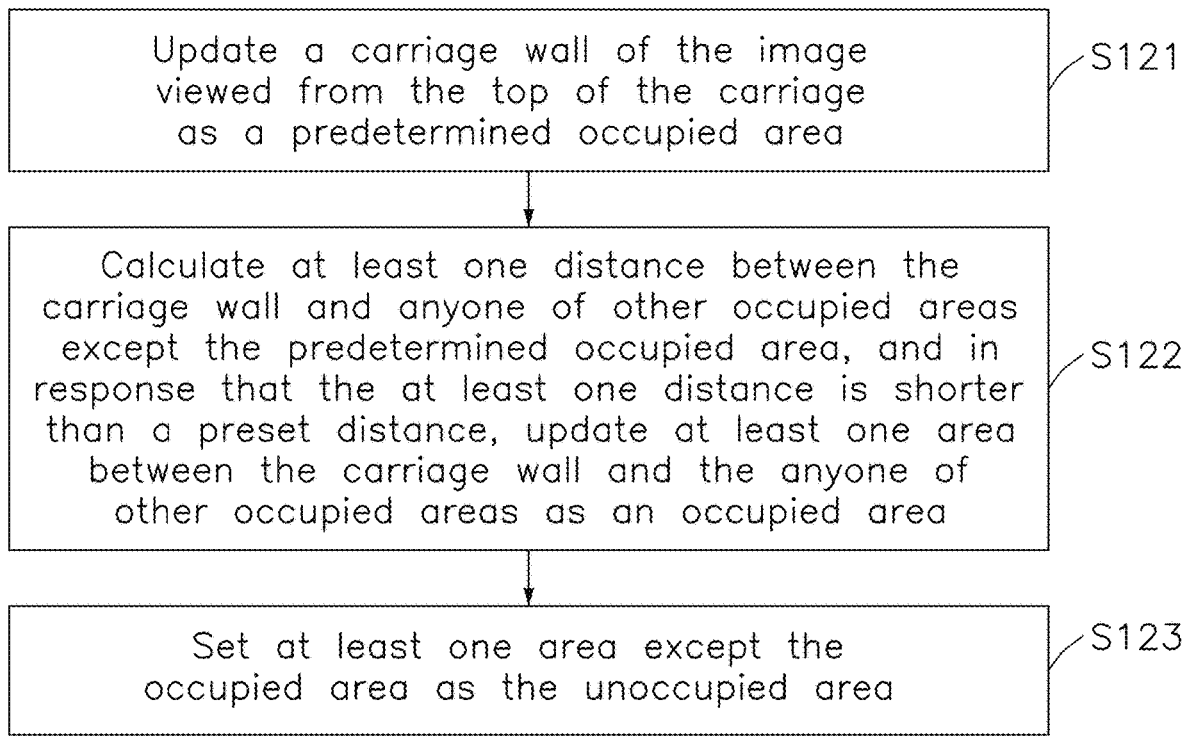
FIG. 4 is a flowchart of determining an unoccupied area provided by an embodiment of the present disclosure.

In one embodiment, as shown in FIG. 4, the flowchart provided for an embodiment of the present disclosure is to determine the unoccupied area, specifically includes the following blocks:

In block S121, the electronic device updates a carriage wall of the image viewed from the top of the carriage as a predetermined occupied area.

In one embodiment, the carriage wall is located at the edge of the carriage and belong to the surrounding closed and fixed area, so the carriage wall can be updated as the predetermined occupied area, which means the area already occupied by the passengers.

In addition, the carriage door is an open area, and passengers need to enter and exit through the carriage door, and when a new passenger enters through the carriage door, the original passenger at the carriage door will be pushed and automatically move to an interior of the carriage and away from the carriage door. Then, the electronic device sets the carriage door as an unoccupied area.

Figure 5:
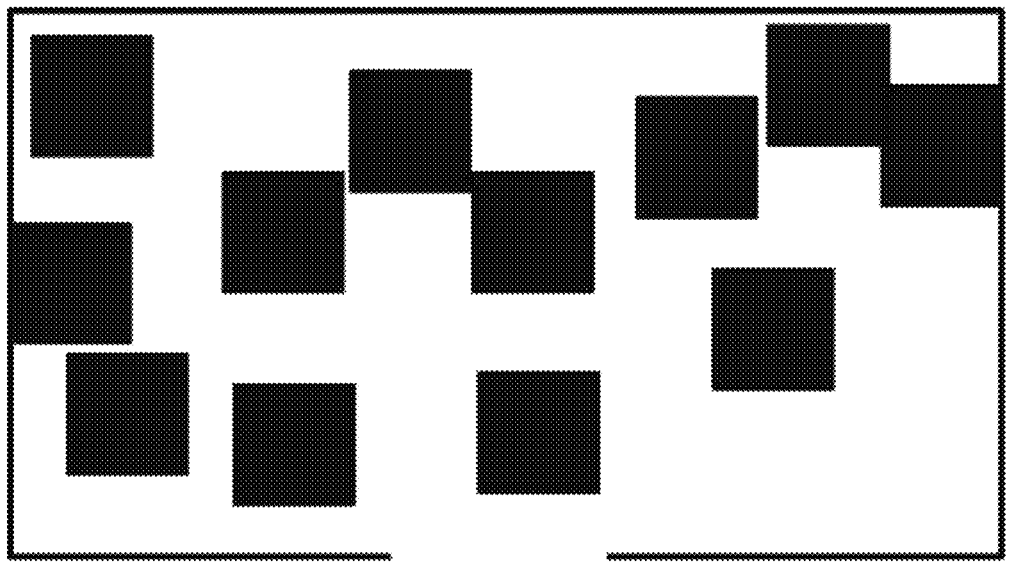
FIG. 5 is a first example diagram of updating an occupied area provided by an embodiment of the present disclosure.

For example, as shown in FIG. 5, it is the first example diagram of updating the occupied area provided by the embodiment of the present disclosure. Based on the FIG. 3, FIG. 5 updates the surrounding carriage wall to the predetermined occupied area indicated by the black solid line. A blank notch of the solid black line of the carriage wall indicates an unoccupied area where the carriage door of each carriage is located.

In other embodiments, other fixed facilities in the carriage may also be considered, for example, rails and seats of the carriage, and the fixed facilities of the carriage may be set as occupied areas.

In block S122, the electronic device calculates at least one distance between the carriage wall and anyone of other occupied areas except the predetermined occupied area, and in response that the at least one distance is shorter than a preset distance, updates at least one area between the carriage wall and the anyone of other occupied areas as an occupied area.

Figure 6:
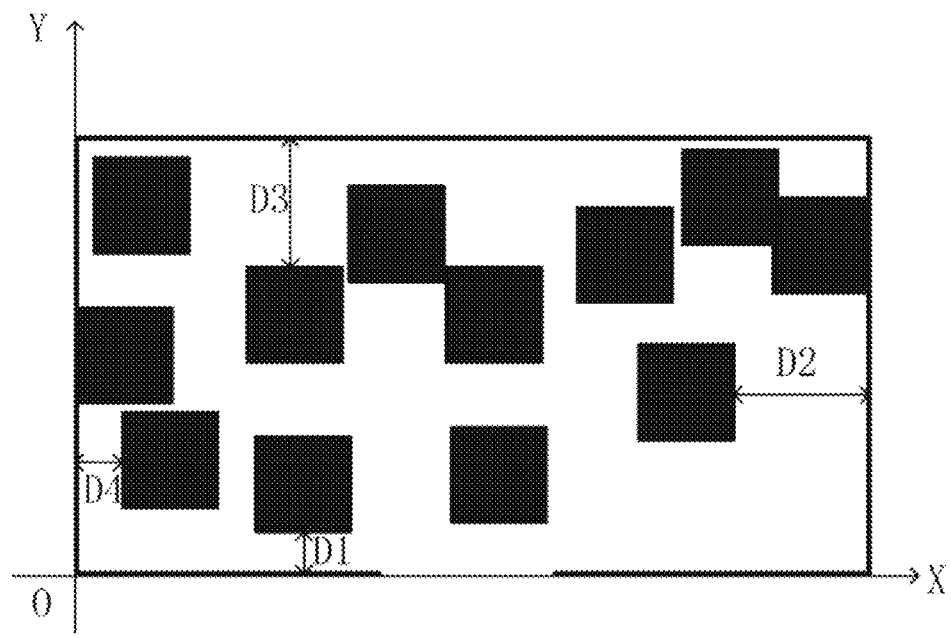
FIG. 6 is an example diagram of a distance between a carriage wall and an occupied area provided by an embodiment of the present disclosure.

In one embodiment, the electronic device calculates the distance between the carriage wall and the anyone of other occupied areas except the predetermined occupied area by establishing a Rectangular coordinate system XOY (as shown in FIG. 6) with a lower left corner of the image viewed from the top of the carriage as a coordinate origin O, a long side of the image viewed from the top of the carriage as a horizontal axis X, and a short side of the image viewed from the top of the carriage as a vertical axis Y. The electronic device sets a size of each pixel as a length unit and calculates the number of pixels between the carriage wall and anyone of other occupied areas based on the Rectangular coordinate system, and sets the calculated number of pixels equal to the distance.

In one embodiment, as shown in FIG. 6, it is an example diagram of a distance between a carriage wall and an occupied area provided by an embodiment of the present disclosure. The electronic device establishes the rectangular coordinate system XOY based on the image viewed from the top of the carriage, and the image viewed from the top of the carriage includes the occupied areas (as shown in FIG. 5). The distances between the carriage wall and any other occupied areas except the predetermined occupied area are shown as D1, D2, D3, and D4, for example.

In one embodiment, when a new passenger enters the carriage, an innermost passenger close to the carriage wall will not move. Therefore, in response that the distance shorter than the preset distance, the passengers in any occupied area corresponding to the distance are already very close to the carriage wall, the electronic device updates the area between any occupied area corresponding to the distance and the carriage wall as the occupied area.

In one embodiment, the electronic device sets the preset distance according to a size of the occupied area corresponding to a human body. For example, the electronic device sets one third or half one of the diameters (or length, width) of the occupied area corresponding to the human body as the preset distance. For example, when the average side length of a square occupied area as shown in FIG. 5 is equal to a length of 30 pixels, then the preset distance may be set to 30×1/3, that is, the preset distance may be equal to a length of 10 pixels.

Figure 7:
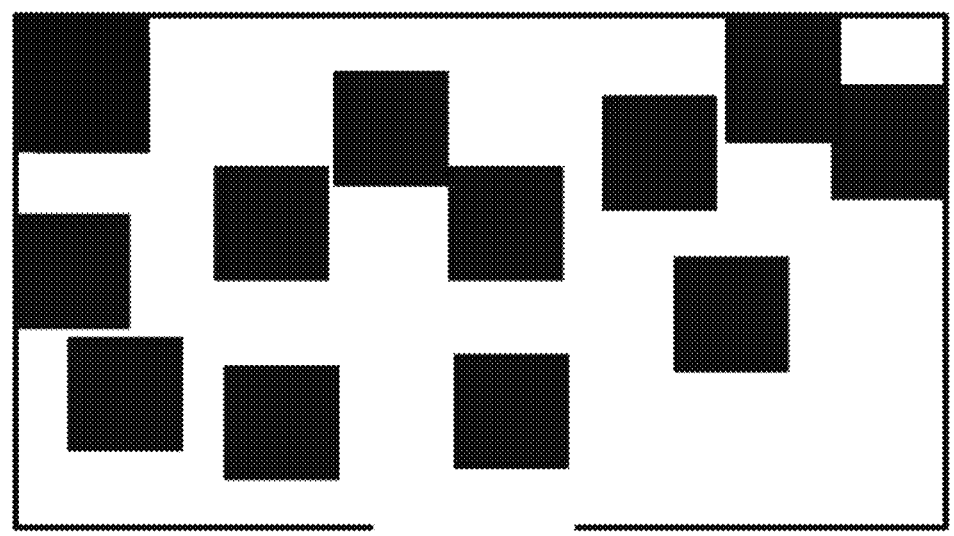
FIG. 7 is a second example diagram of updating an occupied area provided by an embodiment of the present disclosure.

In one embodiment, as shown in FIG. 7, it is a second example diagram for updating an occupied area provided in the embodiment of the present disclosure. Based on the FIG. 5, the updated and established occupied areas are shown in the upper left corner and the upper right corner of FIG. 7.

In block S123, the electronic device sets at least one area except the occupied area as the unoccupied area.

In one embodiment, as shown in FIG. 7, the blank areas outside the black occupied areas are the unoccupied areas.

In block S13, the electronic device divides the unoccupied area into at least one stable unoccupied area and at least one unstable unoccupied area.

In one embodiment, the electronic device divides the unoccupied area into at least one stable unoccupied area and at least one unstable unoccupied area by determining the at least one unoccupied area surrounded by the occupied area as at least one surrounded area; sets the at least one surrounded area as the at least one unstable unoccupied area; sets at least one area of the unoccupied area except the unstable unoccupied area as the at least one stable unoccupied area.

In one embodiment, the electronic device determines the at least one unoccupied area surrounded by the occupied areas as the at least one surrounded area by determining closed contours of the unoccupied areas including the occupied areas using an image recognition algorithm (such as a contour recognition algorithm); and setting at least one unoccupied areas within the closed contours as the at least one surrounded areas.

In one embodiment, when there is an enclosed area surrounded by multiple passengers in the carriage, and a new passenger enters the carriage, the following situations will occur:

Situation 1: The passengers of the carriage in order to avoid the new passenger, will squeeze and move into the surrounded area, or the new passenger will enter the surrounded area. Then, the electronic device sets the surrounded area as an occupied area.

Situation 2: when an area surrounded by multiple passengers is small (for example, smaller than the area threshold described in block S11), the passengers may not move or will move together, making it impossible to accept the new passenger entering the surrounded area. Then, the electronic device sets the surrounded area as an occupied area.

Figure 8:
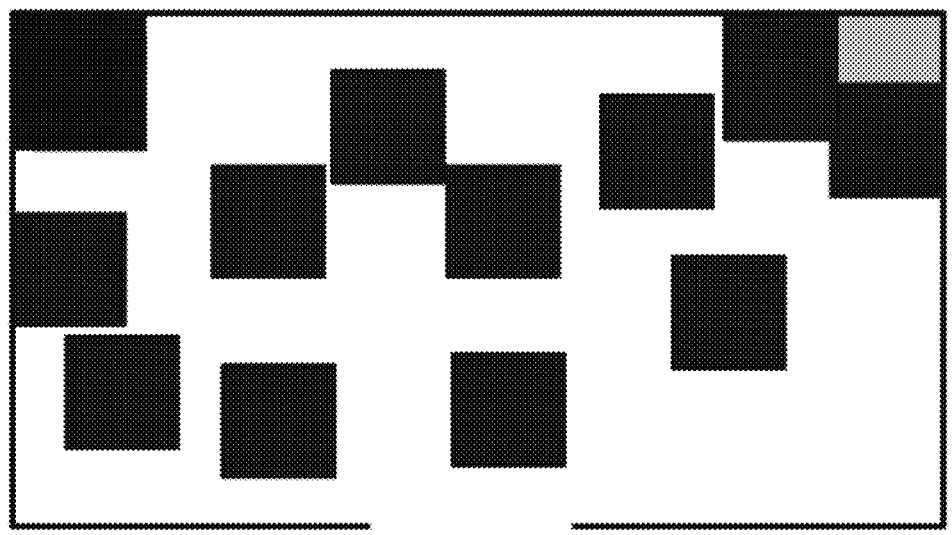
FIG. 8 is an example diagram of an unstable unoccupied area provided by an embodiment of the present disclosure.

Based on the above situations, the electronic device sets the surrounded areas as the unstable unoccupied areas. For example, FIG. 8 is an example diagram of an unstable unoccupied area provided by the embodiment of the present disclosure. A gray area in the upper right corner of FIG. 8 represents an unstable unoccupied area.

In addition, since the other unoccupied areas outside the surrounded area are not closed, existing passengers and new passengers can freely move to the other unoccupied areas. Therefore, the electronic device sets an area of the unoccupied area except the unstable unoccupied area as the stable unoccupied area. For example, the electronic device sets the blank area shown in FIG. 8 as the stable unoccupied area.

In block S14, the electronic device determines a remaining carrying space based on the at least one stable unoccupied area and the at least one unstable unoccupied area.

In one embodiment, the electronic device determines the remaining carrying space based on the at least one stable unoccupied area and the at least one unstable unoccupied area by calculating at least one conversion rate of the at least one unstable unoccupied area to the at least one stable unoccupied area; and determining the remaining carrying space according to at least one size of the at least one stable unoccupied areas, at least one size of the at least one unstable unoccupied area and the at least one conversion rate.

In one embodiment, referring to the description in block S13, it cannot be determined whether all the unstable unoccupied areas can be transformed into the stable unoccupied areas due to the subjective will of the passengers in the carriage. A conversion rate of the unstable unoccupied area to the stable unoccupied area may be determined based on historical data.

Specifically, the historical data are prior data. For example, the prior data indicates that when a size of the historical unstable unoccupied area is in a different area size range, the corresponding conversion rate is different. The size of the historical unstable unoccupied area is proportional to the conversion rate. For example, when the size of the historical unstable unoccupied area is between 300 pixels and 600 pixels, the conversion rate is 0.3; when the size of the historical unstable unoccupied area is between 600 pixels and 900 pixels, the conversion rate is 0.5.

Then, referring to the method of establishing a Rectangular coordinate system in block S122, the electronic device determines the size of each unstable unoccupied area, and the area size range to which the size of each unstable unoccupied area belongs, and then determines the conversion rate of unstable unoccupied area to the stable unoccupied area. For example, the size of the unstable unoccupied area A is equal to 800 pixels, and the area size range is from 600 pixels to 900 pixels, then the conversion rate between the unstable unoccupied area A is and the stable unoccupied area is 0.5.

In one embodiment, the electronic device calculates the remaining carrying space by a formula: $P0=\Sigma S1+\Sigma S2 \times r$. $P0$ is the remaining carrying space, $S1$ is the size of the stable unoccupied area, $S2$ is the area of any unstable unoccupied area, $r$ is the conversion rate corresponding to the any unstable unoccupied area. The electronic device determines the area of the stable unoccupied area by referring to the method of establishing the rectangular coordinate system in block S122.

For example, the size of the stable unoccupied area (blank area) in FIG. 8 is equal to 14600 pixels, the size of the unstable unoccupied area A is equal to 800 pixels and the corresponding conversion rate is 0.5. Then, in FIG. 8 The remaining bearing space P0 is equal to 15000 pixels.

In block S2, the electronic device determines a predicted number of people that can be carried by the carriage according to the remaining carrying space.

In one embodiment, the electronic device determines the predicted number of people by setting the predicted number proportional to the remaining carrying space.

Specifically, the electronic device determines the size S (for example, 15,000 pixels) of the remaining carrying space in block S1, and the electronic device determines the number of people p (for example, 5) that can be accommodated one square meter of the carriage, and determines the number of the pixels N (for example, 1500) corresponding to one square meter of the image viewed from the top of the carriage. So N pixels of the image viewed from the top of the carriage can carry p people, then the predicted number of people that can be carried by the carriage is calculated by the formula: Pimage=(S×p)/N, for example, (15000×5)/1500=50.

In other embodiments, in addition to the above-mentioned method of representing the distance and area by the number of pixels, the electronic device also can obtain a ratio of a length of the image viewed from the top of the carriage to an actual length of the carriage, a ratio of a width of the image viewed from the top of the carriage to an actual width of the carriage. Then, the electronic device obtains the actual distance corresponding to any distance of the image viewed from the top of the carriage and the actual area corresponding to any area of the image viewed from the top of the carriage according to the ratio.

In block S3, the electronic device obtains a recommended remaining number of people that can be carried in the carriage according to a number of people carried in the carriage, the predicted number, and a maximum number of people that can be carried of the carriage.

In one embodiment, the predicted number determined in the block S2 is a value estimated based on the image viewed from the top of the carriage. Since the image viewed from the top of the carriage has been processed multiple times in block S1, the predicted number may have errors and cannot be used as a final recommended remaining number of people. Therefore, there is a need to calculate the final recommended remaining number of people by processing the predicted number according to block S3. For example, the final recommended remaining number of people can be obtained by using a preset ratio, which can be 50%.

In one embodiment, the electronic device obtains the recommended remaining number of people in the carriage by using the formula: the recommended remaining number of people=(the maximum number of people that can be carried in the carriage−the number of people carried in the carriage+predicted number)/2.

In one embodiment, the crowding degree estimation method further includes: detecting a first number of people boarding the carriage and a second number of people getting off the carriage at each station and determining the number of people carried in the carriage according to the first number and the second number.

In one embodiment, each carriage of the public transportation is also equipped with an object movement sensor or a human sensor for detecting a human body. Specifically, the human body sensor may include an infrared sensor, and the infrared sensor may be installed at the position of the door of the carriage (such as frames around the door) to detect the first number and the second number, so as to determine the number of people carried in the carriage according to the first number and the second number.

Specifically, the electronic device obtains the number of people (for example 40) carried in the carriage by starting from an original station of the public transportation, detecting the first number and the second number of each station of the carriage, and adding up the first number of each station after the original station and subtracting the second number of each station after the original station.

In one embodiment, the maximum number of people that can be carried in the carriage is known and provided by the manufacturer of the carriage, for example, the maximum number of people is 101.

In one embodiment, the electronic device obtains a result of the maximum number of people in the carriage minus the number of people carried in the carriage. The result is equal to an ideal remaining number of people in the carriage. But referring to the block of updating the occupied area in block S1, due to various reasons, the carriage cannot continue to carry the ideal remaining number of people. In other embodiments, in addition to the above-mentioned method of setting the recommended remaining number of people to be carried as an average value of the predicted remaining number of people and the ideal remaining number of people, the electronic device also can set the recommended remaining number of people to be carried as a certain value between the predicted remaining number of people and the ideal remaining number of people, so that the carriage can carry as many people as possible, and it can also ensure that the carriage will not be overloaded.

In one embodiment, the recommended remaining number of people may not be an integer, and the electronic device may round the recommended remaining number of people to an integer value. For example, the recommended remaining number of people=(the maximum number of people−the number of people carried in the carriage+the predicted number)/2=(101−40+50)/2=55.5. The electronic device performs rounding off on 55.5 and sets the recommended remaining number of people as 55. In other embodiments, the electronic device performs rounding up on 55.5, and sets the recommended remaining number of people as 56.

In block S4, the electronic device estimates the crowding degree of the carriage according to the recommended remaining number of people and the maximum number of people.

In one embodiment, the electronic device sets the crowding degree of the carriage=1−the recommended remaining number of people/the maximum number of people.

In one embodiment, the crowding degree indicates the degree of congestion of passengers in the carriage, and the higher the crowding degree, the more passengers there are in the carriage, the fewer new passengers can be entered into the carriage. The electronic device does not recommend new passengers to board the carriage. For example, the crowding degree=55/110=0.5.

In one embodiment, the method further includes: displaying the recommended remaining number of people in the carriage for waiting passengers. The electronic device determines a numerical range of the recommended remaining number of people and displays the numerical range by using indicator lights of different colors to indicate the crowding degree.

In one embodiment, the electronic device sends the recommended remaining number of people to be carried and the crowding degree to a terminal, which is communicate with the public transportation through a network. For example, the electronic device sends the recommended remaining number of people to be carried and the crowding degree to a cell phone or a display device install in the station. The cell phone displays the recommended remaining number of people to be carried and the crowding degree by an application software or a small program. Thus, before the vehicle arrives at the station, the waiting passengers can know the recommended remaining number of people to be carried and the crowding degree of each carriage and know the loading status of each carriage. Then the waiting passengers can choose a carriage with a lower crowding degree to wait and to avoid failed boards.

In one embodiment, each carriage may also be equipped with a display device, such as a monitor, for displaying the image viewed from the top of the carriage. Specifically, the display device may be installed outside the door of the carriage, so that passengers waiting for the public transportation can determine the location of the target blank area of the carriage according to the image viewed from the top of the carriage.

In addition, the display device may further include an indicator light, which uses the indicator lights of different colors to display the crowding degree represented by a corresponding numerical range to the waiting passengers. For example, when the numerical range of the crowding degree is from 0.7 to 0.9, the display device uses a red indicator light for indication; when the numerical range of the crowding degree is from 0.1 to 0.2, the display device uses a green indicator light for indication.

In one embodiment, the method for determining a crowding degree of a carriage of the public transportation. The method includes determining a remaining carrying space of the carriage according to an image viewed from the top of the carriage; determining a recommended remaining number of people that can be carried according to the remaining carrying space, the number of people carried in the carriage, and a maximum number of people that can be carried of the carriage; and determining the crowding degree according to the recommended remaining number of people. The method can determine the crowding degree of each carriage of the public transportation and recommend passengers with less crowded carriages to save passengers' waiting time.

The above-mentioned FIG. 1 has introduced the crowding degree estimation method of the present disclosure in detail, and below in conjunction with FIG. 9, the functional modules of the software system for realizing the described crowding degree estimation method and the hardware device architecture for realizing the described crowding degree estimation method are introduced.

It should be understood that the embodiments are only for illustration and are not limited by the structure in terms of the scope of the present disclosure.

Figure 9:
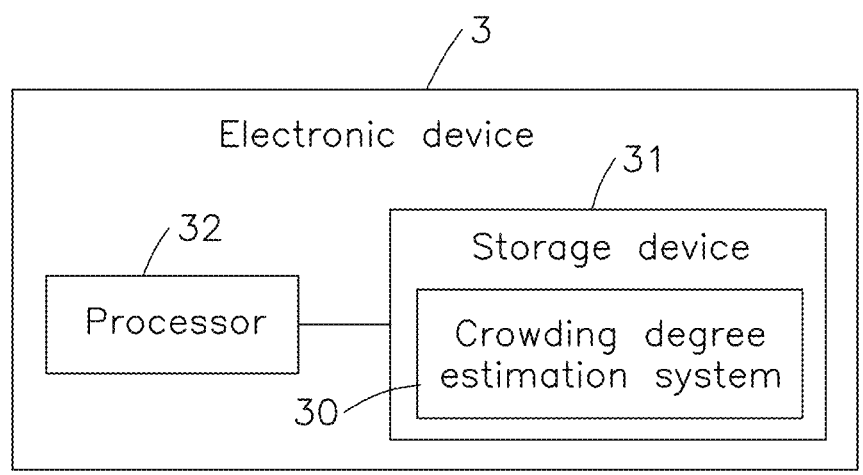
FIG. 9 is a schematic structural diagram of an electronic device provided by an embodiment of the present disclosure.

FIG. 9 is a schematic structural diagram of an electronic device provided by an embodiment of the present disclosure. In at least one embodiment, the electronic device 3 includes a storage device 31, and at least one processor 32. Those skilled in the art should understand that the structure of the electronic device shown in FIG. 9 does not constitute a limitation of the embodiment of the present disclosure, more or less other hardware or software, or a different arrangement of components.

In some embodiments, the electronic device 3 includes a terminal capable of automatically performing numerical calculation and/or information processing according to preset or stored instructions, and its hardware includes but not limited to microprocessors, application-specific integrated circuits, programmable gate arrays, digital processors and embedded devices, etc.

It should be noted that the electronic device 3 is only an example, and other existing or future electronic products that can be adapted to this application should also be included in the scope of protection of this disclosure and are included here by reference.

In some embodiments, the storage device 31 is used to store program codes and various data. For example, the storage device 31 can be used to store the crowding degree estimation system 30 installed in the electronic device 3 and realize high-speed and automatic program or data access during the operation of the electronic device 3. The storage device 31 includes a read-only memory (Read-Only Memory, ROM), a programmable read-only memory (Programmable Read-Only Memory, PROM), an erasable programmable read-only memory (Erasable Programmable Read-Only Memory, EPROM), One-time Programmable Read-Only Memory (OTPROM), Electronically Erasable Programmable Read-Only Memory (EEPROM), Compact Disc Read-Only Memory (EEPROM), Only Memory, CD-ROM) or other optical disk storage, magnetic disk storage, tape storage, or any other computer-readable storage medium that can be used to carry or store data.

In some embodiments, the at least one processor 32 may be include an integrated circuit, for example, may be include a single packaged integrated circuit, or may be include multiple integrated circuits with the same function or different functions packaged, including one or more central processing units (Central Processing unit, CPU), microprocessors, digital processing chips, graphics processors, and various control chips. The at least one processor 32 is the control core (Control Unit) of the electronic device 3, and uses various interfaces and lines to connect various components of the entire electronic device 3, by running or executing programs stored in the storage device 31 or module, and call the data stored in the storage device 31 to execute various functions of the electronic device 3 and process data, for example, to execute the function of crowding degree estimation method shown in FIG. 1.

In this embodiment, the crowding degree estimation system 30 can be divided into multiple functional modules according to the functions it performs. The module referred to in this disclosure refers to a series of computer program segments that can be executed by at least one processor and can complete fixed functions and are stored in a memory.

Although not shown, the electronic device 3 may also include a power supply (such as a battery) that supplies power to various components. The power supply may be logically connected with processor 32 through a power management device, thereby achieving functions such as managing charge, discharge, and power consumption management through a power management device. The power supply may also include one or more DC or AC power supplies, recharging devices, power failure test circuits, power converters or inverters, power status indicators and other arbitrary components. The electronic device 3 can also include a variety of sensors, Bluetooth module, Wi-Fi module, etc., which is not described.

It is understood that the division of modules described above is a logical functional division, and there can be another division in actual implementation. In addition, each functional module in each embodiment of the present application may be integrated in the same processing unit, or each module may physically exist separately, or two or more modules may be integrated in the same unit. The above integrated modules can be implemented either in the form of hardware or in the form of hardware plus software functional modules. The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A crowding degree estimation method using an electronic device, the method comprising:
   generating an image recognition result by performing an image recognition on an image viewed from a top of an interior of a carriage;
   determining a remaining carrying space of the carriage based on the image recognition result, comprising: recognizing at least one area where at least one target object is located by performing a preset image recognition algorithm on the image viewed from the top of the carriage; setting the recognized area as an occupied area; updating the occupied area according to a preset rule and obtaining at least one unoccupied area not overlapping with the occupied area; dividing the at least one unoccupied area into at least one stable unoccupied area and at least one unstable unoccupied area; and determining the remaining carrying space based on the at least one stable unoccupied area and the at least one unstable unoccupied area; wherein the dividing the at least one unoccupied area into the at least one stable unoccupied area and the at least one unstable unoccupied area comprises: determining the at least one unoccupied area surrounded by the at least one occupied area as at least one surrounded area; setting the at least one surrounded area as the at least one unstable unoccupied area; and setting at least one area of the at least one unoccupied area except the at least one unstable unoccupied area as the at least one stable unoccupied area;
   determining a predicted number of people that can be carried by the carriage according to the remaining carrying space;
   obtaining a recommended remaining number of people that can be carried in the carriage according to a number of people carried in the carriage, the predicted number of people, and a maximum number of people that can be carried of the carriage;
   estimating a crowding degree of the carriage according to the recommended remaining number of people and the maximum number of people;
   displaying the recommended remaining number of people in the carriage for waiting passengers; and
   determining a numerical range of the recommended remaining number of people and displaying the numerical range by using indicator lights of different colors to indicate the crowding degree.

2. The crowding degree estimation method according to claim 1, wherein updating the occupied area according to the preset rule and obtaining at least one unoccupied area not overlapping with the occupied area comprises:
   updating a carriage wall of the image viewed from the top of the carriage as a predetermined occupied area;
   calculating at least one distance between the carriage wall and anyone of other occupied areas except the predetermined occupied area, and in response that the at least one distance is shorter than a preset distance, updating at least one area between the carriage wall and the anyone of other occupied areas as an occupied area; and
   setting at least one area except the occupied area as the unoccupied area.

3. The crowding degree estimation method according to claim 1, wherein determining the remaining carrying space based on the at least one stable unoccupied area and the at least one unstable unoccupied area comprises:
   calculating at least one conversion rate of the at least one unstable unoccupied area to the at least one stable unoccupied area; and
   determining the remaining carrying space according to at least one size of the at least one stable unoccupied area, at least one size of the at least one unstable unoccupied area and the at least one conversion rate.

4. The crowding degree estimation method according to claim 3, further comprising:
   setting a predicted number of people that can be carried proportional to the remaining carrying space.

5. The crowding degree estimation method according to claim 1, further comprising:
   detecting a first number of people boarding the carriage and a second number of people getting off the carriage at each station; and
   determining the number of people carried in the carriage according to the first number and the second number.

6. An electronic device comprising:
   a storage device;
   at least one processor; and
   the storage device storing one or more programs, which when executed by the at least one processor, cause the at least one processor to:
   generate an image recognition result by performing an image recognition on an image viewed from a top of an interior of a carriage;
   determine a remaining carrying space of the carriage based on the image recognition result, comprising: recognize at least one area where at least one target object is located by performing a preset image recognition algorithm on the image viewed from the top of the carriage; set the recognized area as an occupied area; update the occupied area according to a preset rule and obtain at least one unoccupied area not overlapping with the occupied area; divide the at least one unoccupied area into at least one stable unoccupied area and at least one unstable unoccupied area; and determine the remaining carrying space based on the at least one stable unoccupied area and the at least one unstable unoccupied area; wherein the processor is further caused to: determine the at least one unoccupied area surrounded by the at least one occupied area as at least one surrounded area; set the at least one surrounded area as the at least one unstable unoccupied area; and set at least one area of the at least one unoccupied area except the at least one unstable unoccupied area as the at least one stable unoccupied area;
   determine a predicted number of people that can be carried by the carriage according to the remaining carrying space;

obtain a recommended remaining number of people that can be carried in the carriage according to a number of people carried in the carriage, the predicted number of people, and a maximum number of people that can be carried of the carriage;

estimate a crowding degree of the carriage according to the recommended remaining number of people and the maximum number of people;

display the recommended remaining number of people in the carriage for waiting passengers; and determine a numerical range of the recommended remaining number of people and display the numerical range by using indicator lights of different colors to indicate the crowding degree.

7. The electronic device according to claim 6, wherein the at least one processor updates the occupied area according to the preset rule and obtain at least one unoccupied area not overlapping with the occupied area by:

updating a carriage wall of the image viewed from the top of the carriage as a predetermined occupied area;

calculating at least one distance between the carriage wall and anyone of other occupied areas except the predetermined occupied area, and in response that the at least one distance is shorter than a preset distance, updating at least one area between the carriage wall and the anyone of other occupied areas as an occupied area; and setting at least one area except the occupied area as the unoccupied area.

8. The electronic device according to claim 6, wherein the at least one processor determines the remaining carrying space based on the at least one stable unoccupied area and the at least one unstable unoccupied area by:

calculating at least one conversion rate of the at least one unstable unoccupied area to the at least one stable unoccupied area; and determining the remaining carrying space according to at least one size of the at least one stable unoccupied area, at least one size of the at least one unstable unoccupied area and the at least one conversion rate.

9. The electronic device according to claim 8, wherein the at least one processor is further caused to:

set a predicted number of people that can be carried proportional to the remaining carrying space.

10. The electronic device according to claim 9, wherein the at least one processor is further caused to:

detect a first number of people boarding the carriage and a second number of people getting off the carriage at each station; and determine the number of people carried in the carriage according to the first number and the second number.

11. A non-transitory storage medium having instructions stored thereon, when the instructions are executed by a processor of an electronic device, the processor is caused to perform a crowding degree estimation method, wherein the method comprises:

generating an image recognition result by performing an image recognition on an image viewed from a top of an interior of a carriage;

determining a remaining carrying space of the carriage based on the image recognition result, comprising:
recognizing at least one area where at least one target object is located by performing a preset image recognition algorithm on the image viewed from the top of the carriage; setting the recognized area as an occupied area; updating the occupied area according to a preset rule and obtaining at least one unoccupied area not overlapping with the occupied area; dividing the at least one unoccupied area into at least one stable unoccupied area and at least one unstable unoccupied area; and determining the remaining carrying space based on the at least one stable unoccupied area and the at least one unstable unoccupied area; wherein the dividing the at least one unoccupied area into the at least one stable unoccupied area and the at least one unstable unoccupied area comprises: determining the at least one unoccupied area surrounded by the at least one occupied area as at least one surrounded area; setting the at least one surrounded area as the at least one unstable unoccupied area; and setting at least one area of the at least one unoccupied area except the at least one unstable unoccupied area as the at least one stable unoccupied area;

determining a predicted number of people that can be carried by the carriage according to the remaining carrying space;

obtaining a recommended remaining number of people that can be carried in the carriage according to a number of people carried in the carriage, the predicted number of people, and a maximum number of people that can be carried of the carriage;

estimating a crowding degree of the carriage according to the recommended remaining number of people and the maximum number of people;

displaying the recommended remaining number of people in the carriage for waiting passengers; and determining a numerical range of the recommended remaining number of people and displaying the numerical range by using indicator lights of different colors to indicate the crowding degree.

12. The non-transitory storage medium according to claim 11, wherein updating the occupied area according to the preset rule and obtaining at least one unoccupied area not overlapping with the occupied area comprises:

updating a carriage wall of the image viewed from the top of the carriage as a predetermined occupied area;

calculating at least one distance between the carriage wall and anyone of other occupied areas except the predetermined occupied area, and in response that the at least one distance is shorter than a preset distance, updating at least one area between the carriage wall and the anyone of other occupied areas as an occupied area; and setting at least one area except the occupied area as the unoccupied area.

13. The non-transitory storage medium according to claim 11, wherein determining the remaining carrying space based on the at least one stable unoccupied area and the at least one unstable unoccupied area comprises:

calculating at least one conversion rate of the at least one unstable unoccupied area to the at least one stable unoccupied area; and determining the remaining carrying space according to at least one size of the at least one stable unoccupied area, at least one size of the at least one unstable unoccupied area and the at least one conversion rate.

14. The non-transitory storage medium according to claim 11, wherein the method further comprises:

detecting a first number of people boarding the carriage and a second number of people getting off the carriage at each station; and determining the number of people carried in the carriage according to the first number and the second number.

* * * * *